United States Patent
Zhao

(10) Patent No.: US 8,877,855 B2
(45) Date of Patent: Nov. 4, 2014

(54) TPE COMPOSITION HAVING GOOD RESEAL, ARTICLES PRODUCED THEREFROM, AND METHOD

(75) Inventor: Xia Zhao, Malvern, PA (US)

(73) Assignee: West Pharmaceutical Services, Inc., Exton, PA (US)

( * ) Notice: Subject to any disclaimer, the term of this patent is extended or adjusted under 35 U.S.C. 154(b) by 268 days.

(21) Appl. No.: 13/266,259

(22) PCT Filed: May 20, 2009

(86) PCT No.: PCT/US2009/044665
§ 371 (c)(1),
(2), (4) Date: Oct. 26, 2011

(87) PCT Pub. No.: WO2010/134915
PCT Pub. Date: Nov. 25, 2010

(65) Prior Publication Data
US 2012/0053285 A1 Mar. 1, 2012

(51) Int. Cl.
*B60C 19/12* (2006.01)
*C08L 53/02* (2006.01)
*C08L 23/08* (2006.01)
*C08L 23/12* (2006.01)

(52) U.S. Cl.
CPC ............ *C08L 53/025* (2013.01); *C08L 2666/06* (2013.01); *C08L 2666/02* (2013.01); *C08L 23/12* (2013.01); *B60C 19/12* (2013.01); *C08L 23/08* (2013.01); *C08L 2205/02* (2013.01)
USPC ......................................................... 524/505

(58) Field of Classification Search
CPC ....... B60C 19/12; C08L 53/025; C08L 23/12; C08L 2205/02; C08L 2666/02; C08L 2666/06; C08L 23/08
USPC ......................................................... 524/505
See application file for complete search history.

(56) References Cited

U.S. PATENT DOCUMENTS

| | | |
|---|---|---|
| 2007/0000926 A1 | 1/2007 | Jacob et al. |
| 2007/0142554 A1 | 6/2007 | Ellul et al. |
| 2009/0036592 A1 * | 2/2009 | Ajbani et al. ................. 524/505 |

OTHER PUBLICATIONS

Int'l Search Report and Written Opinion issued on Jul. 13, 2009 in Int'l Application No. PCT/US2009/044665.

* cited by examiner

*Primary Examiner* — Angela C Scott
(74) *Attorney, Agent, or Firm* — Panitch Schwarze Belisario & Nadel LLP

(57) ABSTRACT

A thermoplastic elastomer (TPE) composition is provided which contains a blend of a hydrogenated styrenic block copolymer (SBC) having a number average molecular weight (Mn) greater than about 200,000 Daltons (Da), a polypropylene, a mineral oil, and at least one filler. The composition has a hardness less than about 80 Shore A and is resealable. An article produced from such a TPE composition reseals itself so as to exhibit no leakage after puncture. A method for preventing leakage in an elastomeric article involves providing an elastomeric article formed from the TPE composition, puncturing the elastomeric article by inserting a sharp object, and removing the sharp object; the article reseals itself such that no leakage occurs from the punctured article after removal of the sharp object.

7 Claims, No Drawings

TPE COMPOSITION HAVING GOOD RESEAL, ARTICLES PRODUCED THEREFROM, AND METHOD

CROSS-REFERENCE TO RELATED APPLICATION

This application is a section 371 of International Application No. PCT/US2009/044665, filed May 20, 2009, which was published in the English language on Nov. 25, 2010, under International Publication No. WO 2010/134915 A1, and the disclosure of which is incorporated herein by reference.

BACKGROUND OF THE INVENTION

The present invention is directed to a thermoplastic elastomer (TPE) composition, particularly for use in penetrable articles.

TPEs are elastic, flexible polymers that exhibit similar physical properties to elastomers, but which are recyclable and easier to process. Compositions made from TPEs are widely used in applications which have traditionally employed silicones (polysiloxanes) and other thermoset rubbers, which do not melt. Articles can be formed from TPE compositions to have similar physical properties as their elastomer counterparts while also being injection moldable, which reduces the cost of production and allows the TPE article to be recycled. TPE compositions can thus be injection molded to form articles such as seals, gaskets, septa, caps for bottles, plugs, medical devices, and other objects that might otherwise be formed from silicone.

TPEs are easier to process than elastomers because they are crosslinked by non-covalent bonds (secondary interactions). At room temperature, TPEs behave like crosslinked elastomers. However, at elevated temperatures, they behave as linear polymers. Thus, TPEs, unlike elastomers, have reversible properties as the temperature increases or decreases. The reversible crosslink allows articles formed from TPE compositions to be melted and reformed.

A TPE can be formed from block copolymers or from blocks of homopolymer having various tacticity within its chains. The elastomeric properties of thermoplastic elastomers result from the phase separation between the blocks. One of the blocks forms a continuous phase, which provides rubbery properties, while another block is glassy or crystalline. The glassy/crystalline blocks provide the crosslinks for the blocks of the continuous phase.

In the case of block copolymers, styrene is frequently used as the glassy/crystalline block that crosslinks with other polymer blocks. Block copolymers that contain styrene are known as styrenic block copolymers, or SBCs. Examples of SBCs include SBS block copolymers (styrene-butadiene-styrene), SIS block copolymers (styrene-isoprene-styrene), and SI/BS block copolymers (styrene-isoprene/butadiene-styrene). SBS, SIS, and SI/BS block copolymers can be hydrogenated to yield the hydrogenated styrenic block copolymers (HSBCs), such as SEBS (styrene-ethylenebutylene-styrene), SEPS (styrene-ethylene/propylene-3-methylbutene-styrene), SEEPS (styrene-ethylene-ethylene/propylene-styrene), and SIPS (styrene-isoprene-styrene block copolymer).

In general, TPE compositions are formed by blending TPEs, polyolefins, and additives, such as plasticizers, stabilizers, and lubricants. The polyolefin functions as the continuous phase of the TPE composition. Polypropylene is the polyolefin typically selected for the continuous phase of many TPE compositions.

It has been found that prior art TPE compositions cannot simultaneously provide desired levels of hardness, temperature stability, moldability, and tensile strength while also exhibiting satisfactory reseal properties. It would be desirable to be able to produce TPE compositions which overcome such limitations.

BRIEF SUMMARY OF THE INVENTION

According to a first aspect, the present invention provides for a thermoplastic elastomer composition comprising a blend of a hydrogenated styrenic block copolymer having a number average molecular weight greater than about 200,000 Daltons, a polypropylene, a mineral oil, and at least one filler. The thermoplastic elastomer composition has a hardness of less than about 80 Shore A and is resealable.

According to another aspect, the present invention provides a resealable thermoplastic elastomeric article. The article comprises a blend of a hydrogenated styrenic block copolymer having a number average molecular weight greater than about 200,000 Daltons, a polypropylene, a mineral oil, and at least one filler, and has a hardness of less than about 80 Shore A.

According to a further aspect, the present invention provides a method for preventing leakage in a punctured elastomeric article comprising:
(a) providing an elastomeric article comprising a thermoplastic elastomer composition comprising a blend of a hydrogenated styrenic block copolymer having a number average molecular weight greater than about 200,000 Daltons, a polypropylene, a mineral oil, and at least one filler; wherein the thermoplastic elastomer composition has a hardness of less than about 80 Shore A;
(b) puncturing the elastomeric article by inserting a sharp object; and
(c) removing the sharp object;
wherein the article reseals itself such that no leakage occurs from the punctured article after removal of the sharp object.

DETAILED DESCRIPTION OF THE INVENTION

The present invention is directed to a TPE composition having good reseal properties. Articles formed from such a composition may be penetrated or punctured by a sharp object, such as a needle, cannula, or IV spike, with no leakage, even after the articles have been subjected to autoclaving. The TPE composition is applicable for the formation of medical articles such as penetrable septa, stoppers, bottle caps, and plugs.

More specifically, the present invention provides for TPE compositions that include a thermoplastic elastomer component (TPE component), a polypropylene, a mineral oil, and at least one filler. Such compositions preferably have a hardness of less than about 80 Shore A and exhibit excellent reseal properties. That is, articles prepared from such compositions exhibit no leakage after being punctured with a sharp object. Further, these reseal properties are exhibited by the TPE compositions even after autoclaving.

After an article produced from the inventive TPE composition is punctured, such as with a needle, IV spike, cannula, or the like, the opening that is formed reseals automatically due to the self-sealing nature of the TPE composition such that no leakage occurs from the punctured article. This property is important for articles that are to be punctured in medical or scientific research use. For example, if a puncture is made in the cap of a bottle filled with liquid, it could be dangerous if the liquid sprayed from the resulting hole after removal of the needle from the cap. This could occur if insufficient resealability were provided by the material used to form the bottle cap.

TPE Component

The advantageous properties exhibited by the TPE compositions are achieved in part by including a TPE component containing a hydrogenated styrenic block copolymer (SBC) having a number average molecular weight (Mn) of at least about 200,000 Daltons. As demonstrated below, including such a high molecular weight hydrogenated SBC in the TPE composition is important for maintaining excellent reseal properties after autoclaving. The use of a high molecular weight hydrogenated SBC also provides the TPE composition with a desirable hardness level below about 80 Shore A, more preferably less than about 65 Shore A, most preferably less than about 50 Shore A.

Exemplary hydrogenated SBCs for use in the TPE component include SEBS, SIBS, and SEEPS. For example, a currently preferred SEBS copolymer is KRATON® G1633 polymer, which has a number average molecular weight of more than 200,000 Daltons and is supplied in fluffy crumb form by the Kraton Polymers Group of Companies. Other SEBS block copolymers, such as KRATON® G1651, which have lower molecular weights, do not provide the desired reseal properties in the resulting TPE composition. Exemplary SEEPS copolymers are Septon 4077 and Septon 4099, commercially available from Kuraray America, Inc. It is also within the scope of the invention to include more than one hydrogenated SBC in the TPE component, provided that the number average molecular weight of each SBC is greater than about 200,000 Daltons.

Polypropylene Component

The polypropylene component provides a continuous phase in the TPE composition of the present invention. The amount of polypropylene component in the TPE composition of the present invention is preferably about 5 to 50 pph (parts per hundred), more preferably about 10 to 50 pph, and most preferably about 10 to 35 pph, relative to 100 parts of the SBC TPE component. For the purposes of this disclosure, the term "pph" may be understood to mean "parts per 100 parts of the SBC TPE component."

The melting point of the polypropylene component is typically above 130° C. The polypropylene may be selected from homopolymers and copolymers of various tacticity, including clarified random polypropylene copolymers, clarified polypropylene homopolymers, and combinations thereof.

Examples of random polypropylene copolymers include copolymers of propylene and an α-olefin, such as ethylene or 4-methyl-1-pentene (PP9074MED, supplied by ExxonMobil Chemical). Suitable clarified polypropylene homopolymers include, for example, Purell HP 570M from Bassell, which has a melting point of 164° C., and Total Petrochemicals M3282MZ, which has a melting point of 153° C. The polypropylene component typically has greater than 70 percent isotactic linkages, and its melt flow rate is in the range of 10 to 100 g/10 min in accordance with ASTM D1238.

Mineral Oil Component

The TPE composition further comprises a mineral oil as a lubricant. The mineral oil assists in providing the desired reseal properties, and also eases the release from a mold cavity of an article molded from the TPE composition. The lubricant also provides a slippery feel to the molded article, which would otherwise be tacky due to the physical properties of the block copolymer.

Appropriate mineral oils for inclusion in the present invention include, for example, paraffinic hydrocarbons such as Primol 352, a purified mixture of liquid saturated hydrocarbons that is commercially available from Exxon Mobil, and Citgo Duoprime Oil 350 (Citgo Petroleum Corporation). The mineral oil is preferably a paraffinic oil, more preferably a high viscosity paraffin oil, because such oils provide the desired color and odor characteristics. The mineral oil must be purified so that the resulting TPE composition will pass the stringent pharmacopeia extraction tests that are required of materials for medical use.

The mineral oil is preferably contained in the TPE composition in an amount of about 10 to 400 pph, more preferably about 50 to about 300 ppm, most preferably about 100 to 200 pph.

Filler Component

Finally, the TPE compositions of the present invention contain at least one filler. Appropriate fillers include, for example, calcium carbonate, clay, talc, silica, and carbon black, but other similar fillers known in the art or to be developed would also be appropriate for inclusion in the TPE compositions. The filler(s) are preferably contained in the composition in an amount of about 10 to about 120 pph, more preferably about 20 to 110 pph, most preferably about 30 to 110 pph. The incorporation of a filler has been shown to have a positive effect on the reseal properties of the composition, particularly after autoclaving.

Optional Components

The TPE compositions of the present invention may also include a stabilizer component. Stabilizers applicable to the present invention include antioxidants, such as hindered phenols. Exemplary stabilizers include those commercially known as IRGANOX® 1010, IRGANOX® 1076, and IRGANOX® PS-800 (distearylpentaerythritol diphosphite) of Ciba Specialty Chemicals and CYANOX® LTDP (Dilaurylthiodipropionate), commercially sold by Cytec. These antioxidants trap free radicals formed upon heating in the presence of oxygen and prevent discoloration or changes in the mechanical properties of the TPE composition.

If included, the amount of stabilizer contained in the TPE compositions of the present invention is preferably in an amount of about 0.01 to 2.0 pph, more preferably about 0.05 to 1.5 pph, and most preferably about 0.1 to 1.0 pph.

It is also within the scope of the invention to include colorants known in the art or to be developed for use in elastomer compositions. The colorant may be selected based on the desired overall appearance of the TPE composition or articles to be made therefrom. For example, if a gray color is desired, Gray 3239, a gray color concentrate in HDPE, would be appropriate. The amount of colorant included in the composition is dependent on the color concentrate and may be determined on a case-by-case basis.

In producing the TPE compositions of the present invention, the components for the TPE composition may be blended by any known method. To obtain a homogeneous TPE composition, the above mentioned components may be dry blended, prior to melt-kneading, using a mixer, such as a Henschel mixer, a tumbler, a ribbon blender, or the like, and then melt-kneaded using a conventional kneader, such as a mixing roll, a kneader, a Banbury mixer, an extruder, or the like. Examples of molding methods useable for forming articles from the TPE composition of the present invention include injection molding, extrusion molding, compression molding, blow molding, rotary compression molding, and the like. It is within the scope of the invention to produce a wide range of articles from the TPE compositions of the present invention, including without limitation medical devices, septa, closures, plugs, bottle caps, etc. However, the TPE composition according to the invention has particular applicability to the production of articles that will be subjected to both autoclaving and puncture, such as penetrable septa and caps for medical bottles.

EXAMPLES

Experimental Procedure

Test plaques were formed from the TPE formulations described in the examples below. The test plaques were compression molded at 350° F. (177° C.), a heating cycle of 5 minutes, a hot compression cycle of 1.5 minutes, and a cooling cycle of 17 minutes. The following tests were performed on the test plaques: ASTM D412 (tensile strength), ASTM D395 (compression set), and ASTM D2240 (hardness). In addition, percent elongation of the test samples was measured after tensile testing, and tensile stress at elongation of 100%, 200%, and 300% was evaluated. The compression set of each test plaque was also determined after autoclaving at 121° C. for one hour using two different conditions: cooling to room temperature under compression and cooling to room temperature without compression.

Reseal properties of the TPE compositions were assessed as follows. The TPE was molded to an IV septum and assembled on a cap, which was assembled onto an IV bottle that was half filled with water. An IV spike having a 6 mm OD was inserted through the TPE septum, thus generating pressure inside the bottle. Depending on the experiment, the IV spike was pulled out at a pressure of 200 mbar (20 kilopascal) or 450 mbar (45 kilopascal) and the reseal rating determined on a relative scale of "0" to "4" as follows. "0" meant that no drop of water appeared from the cap, "1" indicated that a single water drop adhered to the cap, "2" meant that a single drop of water fell off the cap, "3" indicated that multiple drops of water fell off the cap, and a ranking of "4" indicated that water sprayed from the bottle after removal of the spike. The reseal test was performed on the TPE samples both before and after autoclaving at 121° C. for one hour. Each reseal test was performed on multiple samples.

Table 1 below provides a list of the components used to form the TPE compositions in the following examples.

TABLE 1

| Components of TPE Compositions | | |
|---|---|---|
| Component | Trade Name | Generic Name/Description |
| SBC TPE | KRATON ® 1633 | SEBS (Mn of greater than about 200,000 Da) |

TABLE 1-continued

| Components of TPE Compositions | | |
|---|---|---|
| Component | Trade Name | Generic Name/Description |
| SBC TPE | KRATON ® 1651 | SEBS (Mn of less than about 200,000 Da) |
| Polypropylene | Purell HP 570M | Polypropylene (melt flow rate of 7.5 g/10 min) |
| Colorant | Gray 3239 | Gray color concentrate in HDPE |
| Filler | Omyacarb 2-GU | Calcium carbonate |
| Filler | Mistron CB | Talc |
| Mineral Oil | Primol 352 | a purified mixture of liquid saturated hydrocarbons |
| Stabilizer (antioxidant) | IRGANOX ® PS 800 | Distearylpentaerythritol diphosphite |
| Stabilizer (antioxidant) | IRGANOX ® 1010 | Methylene (3,5-di-tert-butyl-4-hydrozyhydrocinnamate) methane |

Example 1

TPE Compositions A-D

Four different TPE compositions (labeled A through D) were prepared to demonstrate the effect of molecular weight of the hydrogenated SBC component on the reseal properties of the composition. Each of the compositions contained polypropylene, mineral oil, filler, a hydrogenated SBC, colorant, and stabilizers.

The TPE compositions each contained the same type and amount of the polypropylene, mineral oil, filler, colorant, and stabilizers, as shown in Table 2 below. Each of the TPE compositions A to D also contained 100 total parts of hydrogenated SBC component selected from KRATON® G1633 (a high molecular weight SEBS having a number average molecular weight of at least about 200,000 Daltons) and KRATON® G1651 (a lower molecular weight SEBS having a number average molecular weight of less than about 200,000 Daltons). The amount of each SBC in Compositions A to D is specified in Table 2 below. The TPE compositions were mixed in a lab twin screw extruder (PRISM TST-24TC) with a batch size of 50 lbs (22.7 kg). The parts were then molded on a production tool.

As described above, samples of the TPE compositions were tested for tensile strength, hardness, compression set before and after autoclaving, ultimate elongation, and tensile stress at elongation of 100%, 200%, and 300%. The resealability of the samples was compared against each other and given a relative ranking for reseal. The test results are set forth in Table 2 below.

TABLE 2

Table 2. Properties of TPE compositions

| | TPE Compositions | | | |
|---|---|---|---|---|
| | A | B | C | D |
| Kraton 1633 | 100 | 75 | 50 | |
| Kraton 1651 | | 25 | 50 | 100 |
| Total Parts SBC | 100 | 100 | 100 | 100 |
| Purell HP 570M | 27 | 27 | 27 | 27 |
| Gray 3239L | 3.9 | 3.9 | 3.9 | 3.9 |
| Primol 352 | 160 | 160 | 160 | 160 |
| Omyacarb 2-GU | 96 | 96 | 96 | 96 |
| Irganox 1010 | 0.195 | 0.195 | 0.195 | 0.195 |
| Irganox PS 800 | 0.78 | 0.78 | 0.78 | 0.78 |
| Total Parts | 387.875 | 387.875 | 387.875 | 387.875 |

TABLE 2-continued

Table 2. Properties of TPE compositions

| | | TPE Compositions | | | |
|---|---|---|---|---|---|
| | | A | B | C | D |
| Physical Properties | | | | | |
| Hardness, Shore A | | 45 | 42 | 40 | 42 |
| Compression set (CS), 70° C., % | | 20 | 23 | 29 | 25 |
| Autoclave CS, Cool under compression, % | | 70 | 77 | 87 | 76 |
| Autoclave CS, Cool w/o compression, % | | 50 | 50 | 62 | 49 |
| Tensile Strength, psi (N/cm$^2$) | | 1260 (870) | 1130 (780) | 930 (640) | 960 (660) |
| % Elongation | | 890 | 910 | 880 | 840 |
| Mod100%, psi (N/cm$^2$) | | 140 (97) | 120 (83) | 120 (83) | 120 (83) |
| Mod200%, psi (N/cm$^2$) | | 190 (130) | 160 (110) | 170 (120) | 160 (110) |
| Mod300%, psi (N/cm$^2$) | | 250 (170) | 210 (140) | 210 (140) | 210 (140) |
| IV Spike Reseal Test Results | | | | | |
| Needle reseal rating: number of samples, 200 mbar (20 kPa), before Autoclave | Port 1 | 0: 16/16 | 0: 12/16<br>1: 4/16 | 0: 14/16<br>1: 2/16 | 0: 13/16<br>1: 3/16 |
| | Port 2 | 0: 16/16 | 0: 11/16<br>1: 4/16 | 0: 14/16<br>1: 2/16 | 0: 12/16<br>1: 4/16 |
| Needle reseal rating: number of samples, 450 mbar (45 kPa), before Autoclave | Port 1 | 0: 12/16<br>1: 4/16 | 0: 13/16<br>1: 3/16 | 0: 15/16<br>1: 1/16 | 0: 15/16<br>1: 1/16 |
| | Port 2 | 0: 14/16<br>1: 2/16 | 0: 10/16<br>1: 6/16 | 0: 14/16<br>1: 2/16 | 0: 12/16<br>1: 4/16 |
| Needle reseal rating: number of samples, 200 mbar (20 kPa), after Autoclave | Port 1 | 0: 12/16<br>1: 4/16 | 0: 9/16<br>1: 7/16 | 0: 9/16<br>1: 6/16<br>2: 1/16 | 0: 11/16<br>1: 2/16<br>2: 2/16<br>4: 1/16 |
| | Port 2 | 0: 10/16<br>1: 6/16 | 0: 10/16<br>1: 5/16<br>2: 1/16 | 0: 13/16<br>1: 2/16<br>2: 1/16 | 0: 6/16<br>1: 8/16<br>2: 2/16 |
| Needle reseal rating: number of samples, 450 mbar (45 kPa), after Autoclave | Port 1 | 0: 12/16<br>1: 4/16 | 0: 13/16<br>1: 2/16<br>2: 1/16 | 0: 11/16<br>1: 4/16<br>2: 1/16 | 0: 11/16<br>1: 2/16<br>2: 2/16<br>4: 1/16 |
| | Port 2 | 0: 9/16<br>1: 7/16 | 0: 12/16<br>1: 2/16<br>2: 2/16 | 0: 10/16<br>1: 4/16<br>2: 2/16 | 0: 4/16<br>1: 7/16<br>2: 2/16<br>3: 1/16<br>4: 2/16 |

Table 2 demonstrates the effect of molecular weight of the SEBS block copolymer on the reseal properties of the TPE compositions after IV spike puncture. It can be seen that while similar reseal properties were exhibited by all four samples A-D before autoclaving, the TPE compositions containing the high molecular weight (greater than about 200,000 Daltons) SEBS exhibited superior reseal properties after autoclaving relative to the TPE compositions containing lower molecular weight SEBS. Such a trend was observed regardless of the internal pressure in the bottle. Further, the resealability after autoclaving decreased with an increase in the amount of lower molecular weight (KRATON® 1651) polymer. Composition A, containing 100 parts of the high molecular weight KRATON® 1633 polymer, provided the best reseal properties before and after autoclaving.

Example 2

TPE Compositions E-F

Two different TPE compositions, labeled as E and F, were formed from a blend of a high molecular weight SEBS block copolymer, a polypropylene, a colorant, a mineral oil, and stabilizer in the amounts shown in Table 3 below. These compositions differed only in the presence (in composition F) or absence (in composition E) of talc (Mistron CB) as a filler. Mixing of the compositions were performed as described above. The test results for tensile strength, compression set, hardness, elongation, and reseal, as described above, are set forth in Table 3 below.

TABLE 3

Table 3. Properties of TPE Compositions

| | Sample # | |
|---|---|---|
| | E | F |
| Kraton 1633 | 100 | 100 |
| Purell HP 570M | 27 | 27 |
| Gray 3239L | 2.8 | 3.4 |
| Primol 352 | 150 | 160 |
| Mistron CB | | 50 |
| Irganox PS 800 | 0.56 | 0.68 |
| Total | 280.36 | 341.08 |
| Physical Properties | | |
| Hardness, Shore A | 42 | 44 |
| Compression Set (CS), 70° C., % | 26 | 22 |
| Autoclave CS, Cool under compression, % | 70 | 69 |
| Autoclave CS, Cool w/o compression, % | 50 | 54 |
| Tensile Strength, psi (N/cm$^2$) | 1810 (1250) | 1370 (940) |
| % Elongation | 850 (580) | 840 (580) |
| Mod100%, psi (N/cm$^2$) | 150 (100) | 170 (120) |
| Mod200%, psi (N/cm$^2$) | 210 (140) | 270 (190) |
| Mod300%, psi (N/cm$^2$) | 280 (190) | 350 (240) |

TABLE 3-continued

Table 3. Properties of TPE Compositions

| | | Sample # | |
|---|---|---|---|
| | | E | F |
| IV Spike Reseal Test Results | | | |
| Needle reseal rating: number of samples, 200 mbar (20 kPa), before Autoclave | Port 1 | 0: 30/30 | 0: 30/30 |
| | Port 2 | 0: 30/30 | 0: 30/30 |
| Needle reseal rating: number of samples, 450 mbar (45 kPa), before Autoclave | Port 1 | 0: 29/30<br>1: 1/30 | 0: 30/30 |
| | Port 2 | 0: 30/30 | 0: 30/30 |
| Needle reseal rating: number of samples, 200 mbar (20 kPa), after Autoclave | Port 1 | 0: 28/30<br>1: 2/30 | 0: 30/30 |
| | Port 2 | 0: 27/30<br>1: 3/30 | 0: 30/30 |
| Needle reseal rating: number of samples, 450 mbar (45 kPa), after Autoclave | Port 1 | 0: 22/30<br>1: 5/30<br>2: 3/30 | 0: 30/30 |
| | Port 2 | 0: 23/30<br>1: 3/30<br>2: 3/30<br>3: 1/30 | 0: 30/30 |

Table 3 demonstrates the effect of filler on the IV spike reseal of the resulting composition. It can be seen that inclusion of a filler (in Composition F) improved resealability, particularly after autoclaving.

Through extensive and intensive experimentation, it has been found according to the present invention that a thermoplastic elastomeric article having excellent resealability, high tensile strength, and a hardness of less than about 80 Shore A can be formulated by including a hydrogenated SBC having a particular high molecular weight. In particular, blending a hydrogenated SBC with a molecular weight greater than about 200,000 Daltons with a polypropylene, mineral oil, and filler provides for a TPE article with a hardness less than about 80 Shore A, preferably less than about 65 Shore A, more preferably less than about 50 Shore A, while maintaining adequate temperature stability, moldability, tear strength, and tensile strength characteristics. In general, a softer material is more desirable for sealing purposes. In addition, such a TPE composition maintains its properties, including reseal properties, after autoclaving.

In another embodiment, the present invention provides for a resealable article manufactured from a thermoplastic elastomer as described above. Resealable articles that may be produced include, without limitation, penetrable closures, including septa, caps and plugs, such as for medical containers, and the like. These articles are particularly desirable in the medical and scientific research fields due to their resealable properties, even after autoclaving.

The invention also relates to a method for preventing leakage in a punctured elastomeric article. The method involves providing an elastomeric article comprising a thermoplastic elastomer composition as previously described, puncturing the article by inserting a sharp object, such as a needle, cannula, or IV spike, and removing the sharp object. Due to the resealable nature of the TPE composition used to produce the elastomeric article, the article reseals itself such that no leakage occurs from the punctured article. This property is observed regardless of the nature of the sharp object, and objects made of metal, plastic or other materials and having varying diameters may be used to puncture the elastomeric article.

The ability to produce a punctured elastomeric article with no leakage is significant. In the medical and scientific fields in particular, it is often necessary to puncture an elastomeric closure, such as an IV bottle cap, by inserting a sharp object, such as a cannula, in order to transfer fluid through the closure. Following removal of the sharp object from the inventive elastomeric article, the opening formed from the sharp object reseals automatically, thus re-forming a continuous seal with no leakage. Leakage from such seals would be undesirable and potentially dangerous to a patient, healthcare worker, or scientist.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A thermoplastic elastomer composition comprising a blend of:
    a hydrogenated styrenic block copolymer having a number average molecular weight greater than about 200,000 Daltons;
    a polypropylene;
    a mineral oil; and
    at least one filler;
    optionally further comprising of at least one selected from the group consisting of a stablilizer and a colorant;
    wherein the thermoplastic elastomer composition has a hardness of less than about 80 Shore A and is resealable.

2. The thermoplastic elastomer composition of claim 1, wherein the hydrogenated styrenic block copolymer is selected from the group consisting of a SEBS (styrene-ethylene-butylene-styrene) block copolymer, a SIPS (styrene-isoprene-styrene) block copolymer, and a SEEPS (styrene-ethylene-(ethylene-propylene)-styrene) block copolymer.

3. The thermoplastic elastomer composition of claim 1, wherein the at least one filler is selected from the group consisting of calcium carbonate, clay, talc, silica, and carbon black.

4. The thermoplastic elastomer composition of claim 1, wherein the elastomer composition has a hardness of less than about 65 Shore A.

5. The thermoplastic elastomer composition of claim 4, wherein the elastomer composition has a hardness of less than about 50 Shore A.

6. The thermoplastic elastomer composition of claim 1, consisting of about 100 parts of the hydrogenated styrene block copolymer, about 5 to 50 pph of the polypropylene, about 10 to 400 pph of the mineral oil, and about 10 to 120 pph of the at least one filler.

7. The thermoplastic elastomer composition according to claim 1, wherein the thermoplastic elastomer composition is autoclavable.

* * * * *